J. M. DODGE.
CHAIN LINK.
APPLICATION FILED FEB. 8, 1913.
1,130,580.
Patented Mar. 2, 1915.
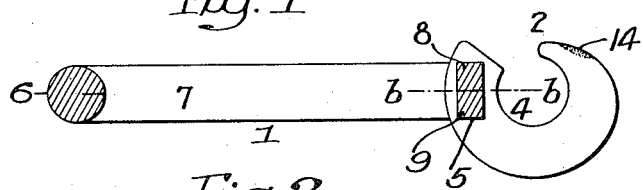
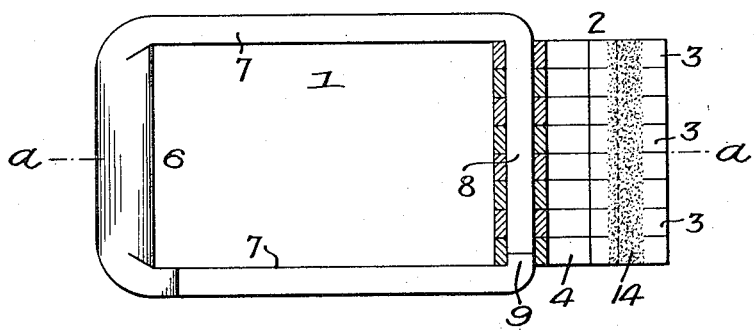
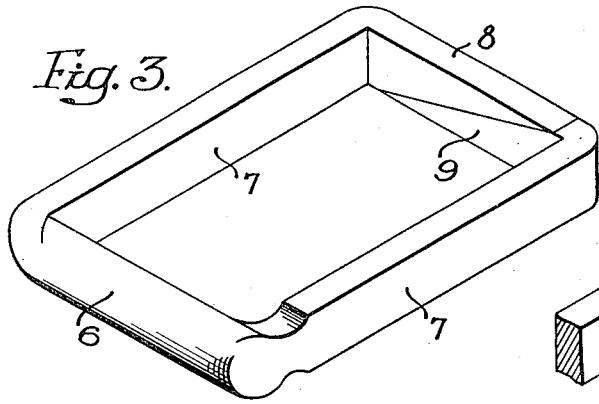
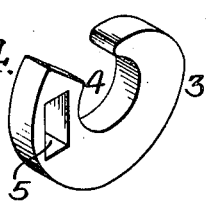
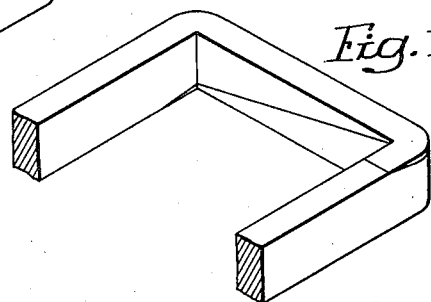
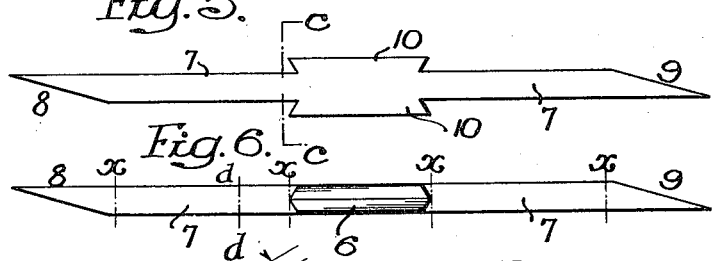
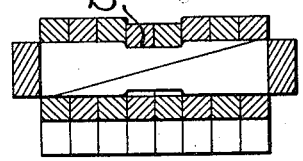
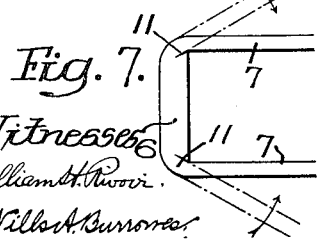
Inventor-
James M. Dodge.
by his Attorneys-
Howson & Howson
Witnesses
William H. Rowor
Willis A. Burrowes

UNITED STATES PATENT OFFICE.

JAMES M. DODGE, OF PHILADELPHIA, PENNSYLVANIA.

CHAIN-LINK.

1,130,580.   Specification of Letters Patent.   Patented Mar. 2, 1915.

Application filed February 8, 1913. Serial No. 747,101.

*To all whom it may concern:*

Be it known that I, JAMES M. DODGE, a citizen of the United States, residing in Philadelphia, Pennsylvania, have invented certain Improvements in Chain-Links, of which the following is a specification.

My invention relates to certain improvements in that type of chain in which the links are provided, at one end, with a hook and, at the opposite end, with a bar adapted to the hook of an adjoining link. These links are made detachable and interchangeable.

The object of the present invention is to manufacture a link of this type from sheet metal cut into shape and assembled to form a unitary structure.

In the accompanying drawings: Figure 1, is a sectional view on the line $a$—$a$, Fig. 2; Fig. 2, is a sectional plan view on the line $b$—$b$, Fig. 1; Fig. 3, is a perspective view of the link element; Fig. 4, is a perspective view of one of the hook elements; Figs. 5, 6 and 7, are views illustrating different steps in the manufacture of the link element; Fig. 8, is a sectional view on the line $c$—$c$, Fig. 5; Fig. 9, is a sectional view on the line $d$—$d$, Fig. 6; and Figs. 10, 11 and 12, are views illustrating different modifications of the invention.

Referring to the drawings, 1 is the link member and 2 is the hook member. The hook member consists of a series of elements 3 formed by punching from a strip of sheet metal. Each of these elements has a socket 4 for the end bar of an adjoining link and a quadrangular opening 5 through which a portion of the link element extends. The link element consists of an end bar 6, side members 7, and cross members 8 and 9, which are tapered, as shown in Fig. 3, so that one will overlap the other.

The link element is made from a strip of metal punched to form a blank of the shape illustrated in Fig. 5. The central portion of the blank, from which the end bar 6 is formed, is wider than the other portions and the ends of this portion are beveled or undercut, as shown.

When the blank is punched, the projecting portions 10 are slightly bent, as shown in Fig. 8, due to the form of the die, and this gives the initial bend so as to insure the parts bending in the proper direction when the final bending and shaping takes place. The blank is then placed in suitable dies to form the cylindrical end bar 6, as illustrated in Figs. 6 and 9, with the abutting ends so located that they will be on the inner side of the bar when the blank is bent to form the link member, as illustrated in Fig. 1. When the bar is formed, as in Fig. 6, the ends 11 are beveled, as indicated in Fig. 7, so that when the blank is bent on the line $x$, as illustrated in Fig. 6, the bends at the ends of the bar 6 are made much easier than if the ends of the portions 10 were at right angles to the center line of the bar. This construction also insures the full finish of the end bar and the side bars, as illustrated in Figs. 2 and 7. By making the bend so that it will be on the inner side of the bar 6, the bar can be worn away to a considerable extent without materially weakening the link, as the solid portion of the bar is on the outer side of the link member. After the link element is bent, the cross members 8 and 9 are passed through the openings 5 in the several hook elements 3, which form the hook member 2. The cross members 8 and 9 can be secured to the hook members by brazing or welding or by other means, and the several hook members may be secured to each other at 14 by brazing or welding, as illustrated in Figs. 1 and 2, or they may be secured together by a rivet 12, Fig. 12. While I have illustrated a single rivet, two or more rivets may be used, depending upon the size of the link.

In the present instance, as illustrated in Figs. 1 and 2, the parts are welded together by the use of an acetylene torch. The several elements 3 are secured together near the end of the hook, as indicated at 14, and the cross bars 8 and 9 are welded together and to the hook member by the use of the acetylene torch. The welding need not extend over all of the hook elements at the point where the cross bars are connected to the hook, but I prefer to extend the welding as far as possible.

The cross members are preferably tapered so that one will overlap the other, as illustrated in Fig. 3. I may notch these members at 13, Fig. 10, and force the metal of the central hook elements into the notch as an additional means of preventing the side members spreading apart. Both of these cross members may be notched so that they can be reversed, although, in some instances, the central hook elements can be pressed into the notch at either side.

In Fig. 11, I have shown the tapered cross members of a greater length than the width of the chain, so that the ends can be turned over, forming a rivet to prevent the pulling apart of the side members.

While I have shown my invention as applied to a link having an open socket of the detachable type, the shape and design of the link may be modified without departing from essential features of the invention which relate to the built up hook member and the means for securing the side bars to the said hook member.

I claim:—

1. A chain link consisting of a number of hook elements placed side by side and forming the hook member of the link; and a link member having an end bar extending transversely through the hook member and securing the several hook elements together.

2. A chain link having a quadrangular link member and a hook member, said hook member being made of a number of flat elements placed side by side, each of said elements having a hook and being perforated back of the hook; each link member having a crossbar extending through the perforations and secured to the hook elements.

3. The combination in a chain link, of a hook member and a quadrangular link member, the hook member being made of a series of elements assembled side by side, each element having a hook; a transverse quadrangular opening back of the hook; a link member having a cross bar quadrangular in section and adapted to the openings in the elements forming the hook member, whereby the said elements are held in alinement in respect to the link element.

4. The combination in a chain link, of a hook member and a link member, the hook member being made of a number of punched elements, each of said elements being perforated at the rear of the hook and secured together, the link member having a cross bar extending through the openings in the hook elements and secured to the said hook member.

5. The combination in a quadrangular chain link, of a hook member and a quadrangular link member having integral end bars, one end bar of the link member being secured to the hook member, the other end of the bar of the link being round and having abutting longitudinal surfaces and having a greater amount of metal than the side bars of the said link member, the abutting surfaces of the end bar being on the inner side thereof.

6. The combination in a chain link, of a hook member and a link member secured together; the hook member being perforated transversely for the reception of the link member; said link member consisting of a round end bar, side members and tapered cross bars; said tapered cross bars extending through the perforations in the hook member from opposite sides.

7. The combination in a chain link, of a hook member and a link member secured together; the hook member being perforated transversely for the reception of the link member; said link member consisting of a round cross bar, side members and tapered cross members; said tapered cross members extending through the perforations in the hook member from opposite sides; and said cross member being notched to receive the metal forced into it from some of the elements of the hook member.

In testimony whereof, I have signed my name to this specification, in the presence of two subscribing witnesses.

JAMES M. DODGE.

Witnesses:
Jos. H. Klein,
Wm. A. Barr.